Figure 1:
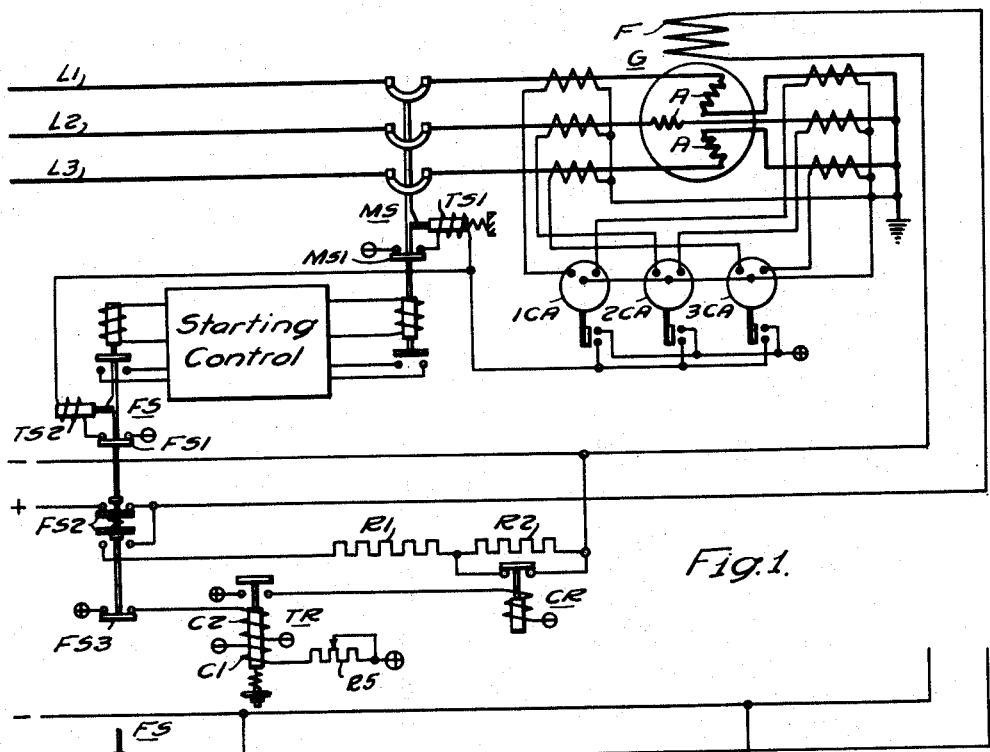

Oct. 11, 1949.   E. G. RATZ   2,484,247
MEANS TO OPEN GENERATOR FIELD CIRCUIT AND TO
DISSIPATE STORED MAGNETIC FIELD ENERGY
Filed Oct. 8, 1945   2 Sheets-Sheet 1

WITNESSES:
E. A. M'Closkey
E. F. Oberheim

INVENTOR
Elmer G. Ratz

BY
Paul E. Friedemann
ATTORNEY

INVENTOR
Elmer G. Ratz

Patented Oct. 11, 1949

2,484,247

UNITED STATES PATENT OFFICE 2,484,247

MEANS TO OPEN GENERATOR FIELD CIRCUIT AND TO DISSIPATE STORED MAGNETIC FIELD ENERGY

Elmer G. Ratz, Hamilton, Ontario, Canada, assignor to Westinghouse Electric Corporation, East Pittsburgh, Pa., a corporation of Pennsylvania Application October 8, 1945, Serial No. 621,077

11 Claims. (Cl. 171—118)

This invention relates to generator control systems and more particularly to systems which control the rate of discharge of generator fields.

Numerous efforts have been made in the past to minimize the effect of faults on generators. Most of these, however, provide only for extremely fast disconnection of the generator from its load and the disconnection of its field circuits. This, in most cases, does not have maximum effectiveness since the self-induced E. M. F. of the generator requires some time to drop due to the relatively slow decay of the field flux. Should a generator be faulted, for example, in one of its armature windings, it is extremely important that the field flux be reduced to a negligible value, and preferably to zero, as quickly as possible to eliminate the self-generated voltage, for the reason that the self-generated voltage causes damage at the point where the generator is faulted as long as it exists. In the usual case, for example, it has been found that in large machines 8 to 20 seconds may be required for the complete discharge of a field circuit having a fixed resistance. This invention provides means whereby the field discharge time may be reduced, if desired, to one second or less.

Protective relays which operate in one cycle or less are now utilized to sense fault conditions and trip out the switches connecting the generator field to its energizing source and the armature to the load circuits; but the gain in speed of such relays is largely ineffective as far as the self-generated E. M. F. of the generator is concerned. In other words the gain of 5 or 6 cycles in fault-sensing relay operation over some of the early types is of little value in view of the slow decay of the generator field flux. In the ordinary case, the field discharge resistor is made as high in ohmic value as the field insulation will permit. Obviously the higher the discharge resistance the quicker the field flux will decay. As soon as the generator is disconnected from its load circuits and the field switch is opened to disconnect the field from its energizing source and to connect the discharge resistor across the field, the decaying field flux of the generator, due to the change in flux, generates a self-induced E. M. F. in the field and this E. M. F. discharges gradually through the discharge resistor. The higher the ohmic value of the discharge resistor the greater the self-induced voltage will be, and, therefore, the more rapid the decay of the field flux. The limit, of course, is determined by the voltage the field windings may withstand without puncturing the insulation.

This invention has for its object the provision of a control for a generator whereby the decay of the generator field flux is as rapid as possible when the generator field is connected with its discharge circuit.

More specifically stated the object of this invention is to increase the resistance of the field discharge circuit as the self-induced voltage drops.

Figure 2:
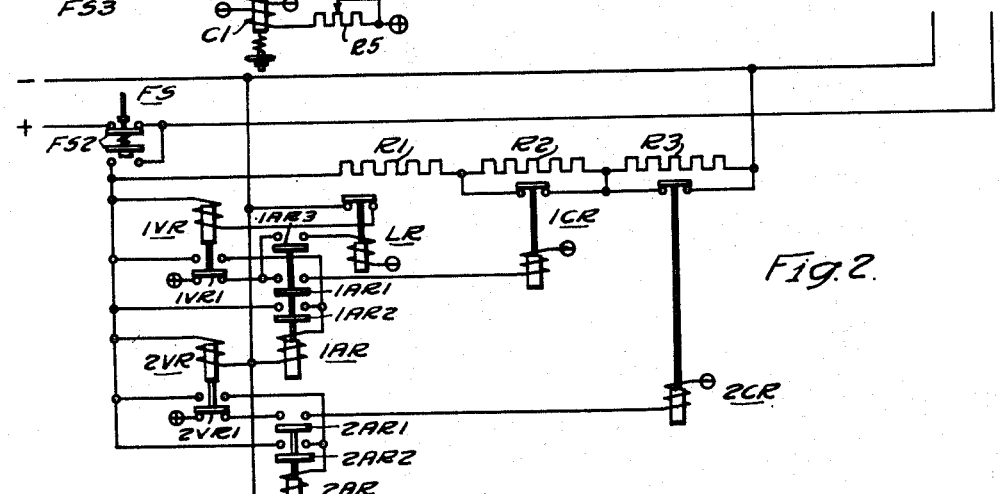
Figure 3:
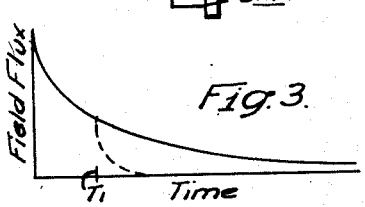
Figure 4:
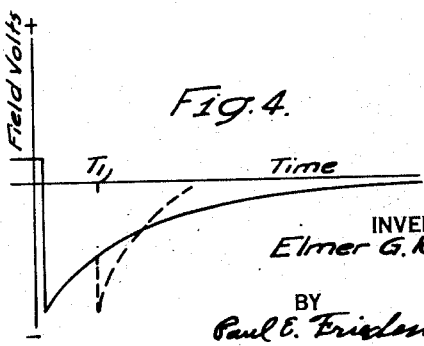
Figure 5:
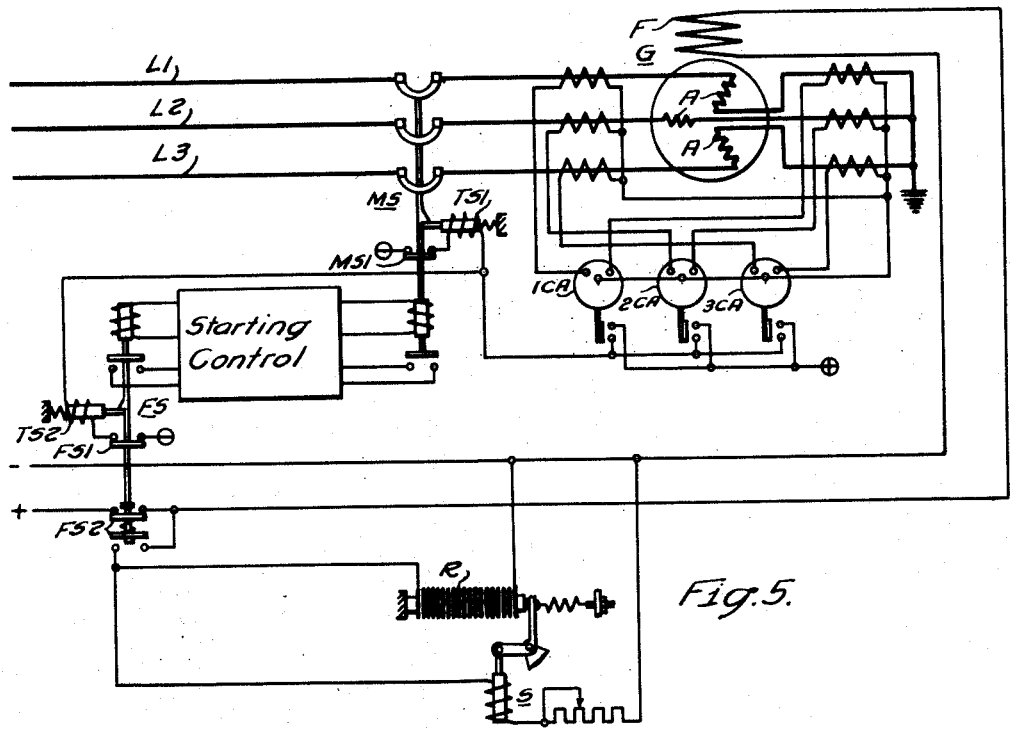

The foregoing objects are merely illustrative of the various aims and objects of this invention. Other objects and advantages will become more apparent from a study of the following specification when considered in conjunction with the accompanying drawings, in which:

Figure 1 is a generator control circuit embodying the principles of this invention, Fig. 2 is a modification of the invention of Figure 1, Fig. 3 is a graph of generator field flux with respect to time and compares the flux decay in a field circuit having a fixed discharge resistor with that obtainable with the present invention, Fig. 4, similar to Fig. 3, compares the rate of decay of the self-generated discharge voltages of the fixed resistor field discharge circuit with the variable resistor type of this invention, Fig. 5 is a modification of the invention of Figure 1 providing an increase in generator field discharge resistance in infinitely small steps in response to the dropping discharge voltage.

Figure 6:
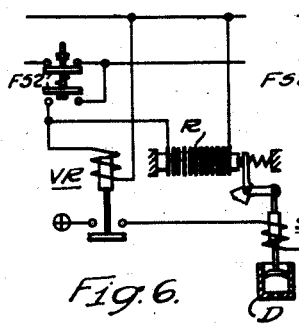
Figure 7:
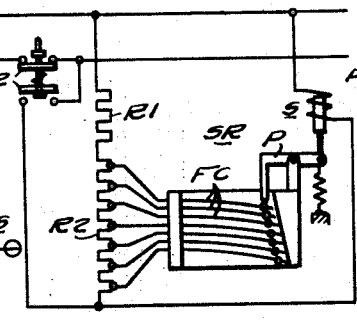
Figure 8:
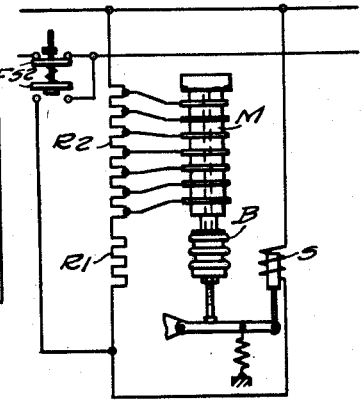
Figure 9:
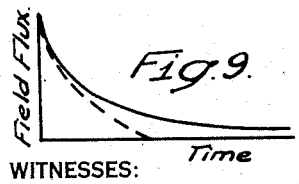
Figure 10:
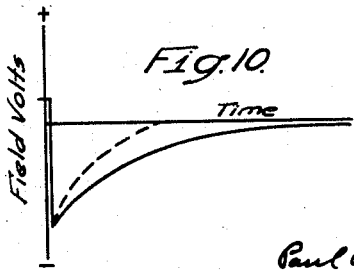

Fig. 6 is a modification of the invention of Fig. 5,

Figs. 7 and 8 embrace the principles of Fig. 5 but utilize different resistor control elements, Fig. 9 graphically illustrates the rate of decay of the field flux obtainable with the modifications of the invention in Figs. 5 through 8 as compared with the standard fixed resistor type of discharge circuit, and Fig. 10 similarly compares the discharge voltages.

The embodiment of the invention illustrated in Figure 1 includes, a generator G having armature windings A connected to the load circuits L1, L2 and L3 through the main switch MS and field windings F connected to a source of electrical energy indicated generally by the + and − signs, through the field switch FS; a group of three current-responsive automatic relays ICA, 2CA and 3CA, each responsive to the differential of the currents in the circuits on opposite sides of one of the generator armature windings and having their contact elements each connected in energizing circuits for the coil of the tripping solenoids TS1 of the main switch MS and TS2 of the field switch FS; and a time delayed field discharge control arrangement including the resistors R1 and R2, the timing relay TR and the control relay CR which, in its normal or inoperative position, shunts the resistor R2.

Each of the current-responsive automatic relays ICA, 2CA and 3CA are energized by the differential of the electrical outputs of a pair of current transformers, respectively, energized by the currents on opposite sides of each of the generator armature windings. The outputs of each pair of current transformers are in opposition in the associated automatic relay in the manner well known to the art.

The automatic relays are preferably of the type which respond extremely fast to a current differential which may result, for example, from a grounding of an armature winding on the armature iron. Any one of the automatic relays upon closing its contacts completes an energizing circuit for the coils of the tripping solenoids TS1 and TS2.

The control for the field switch FS and the main switch MS is represented in block diagram. It will be understood, however, that such a control includes a conventional arrangement of push buttons and other control devices for effecting proper operation of the system. As illustrated, the main switch and field switch are in their operated positions and thus the armature winding is connected to its load circuits and the field winding connected to its energizing source.

Should a fault occur on any of the generator armature windings, the associated current-responsive automatic relay is operated to immediately actuate the tripping solenoids TS1 and TS2 thus simultaneously tripping out the main switch and the field switch. The main switch disconnects the armature windings from the load circuits. In dropping out, the field switch FS opens its contacts FS1 in the energizing circuit for the tripping solenoid TS2 and at its make-before-break contacts FS2 it opens the energizing circuit for the field winding F and connects the discharge circuit including the resistors R1 and R2 thereacross, and at its contacts FS3 opens the energizing circuit for the operating coil C2 of the timing relay TR. Timing relay TR is a short time relay having a consistent and precise short drop out time relay for energizing the relay CR. Coil C1 of relay TR is the neutralizing coil. By adjustment of resistor R5 the neutralizing effect can be varied and, hence, a control of the relay's time characteristic obtained. Further adjustment of the time characteristic is obtained by changing the setting of the tension spring attached to the armature of the relay. Thus relay TR has an adjustable short time characteristic and may be timed to drop out at the instant the field flux and voltage have dropped sufficiently that resistor R2 may be inserted. Meanwhile the resistor R1 is connected across the field winding F and the field flux and voltage resulting therefrom are substantially as indicated for the first instant in Figs. 3 and 4. A timed interval later as the time T1 when the field flux has dropped sufficiently that the resistor R2 may be inserted in the discharge circuit without producing a voltage peak in excess of the maximum voltage that the field insulation may permit, the timing relay TR drops out and closes its contact members which complete an energizing circuit for the coil of the control relay CR. Relay CR opens the contact members which shunt the resistor R2 and insert that resistor in series with the initial discharge resistor R1. This results in a much higher power loss in the field discharge circuit and produces the flux decay and voltage response as represented by the dotted curves, respectively, of Figs. 3 and 4. It is apparent from these curves that complete field discharge is achieved in considerably less time than with the fixed value of resistance indicated by the solid curves thus minimizing the effect of the fault condition. Additional timing and control relays may be utilized to operate at timed intervals along with additional resistors to obtain an optimum rate of decay of the field flux.

Fig. 2 is different in arrangement than Figure 1 and provides a control which depends for the application of additional resistance in the field discharge circuit upon the decay of the self-generated voltage. This arrangement includes a pair of voltage relays 1VR and 2VR adjusted for dropout at different holding voltages, each being connected across the resistor discharge circuit including the series connected resistors R1, R2 and R3. Each of the voltage relays operates, respectively, in conjunction with the auxiliary relays 1AR and 2AR to complete energizing circuits for the control relays 1CR and 2CR. Lockout relay LR opens the energizing circuit for the 1VR relay once its operating cycle is completed and thus prevents that voltage relay from picking up on the second discharge voltage peak, which occurs when the resistor R2 is inserted in the field discharge circuit.

When the field switch FS drops out and the back contacts of the make-before-break contacts FS2 close the voltage relays 1VR and 2VR are energized by the self-generated voltage in the field discharge circuit and each closes the front contacts of the its respective contact assembly 1VR1 and 2VR1. Auxiliary relays 1AR and 2AR are thus energized and, respectively, close their contacts 1AR1, 1AR2 and 2AR1, 2AR2. Contacts 1AR2 and 2AR2 are the holding contacts for each relay while the contacts 1AR1 and 2AR1 complete partial energizing circuits for each control relay 1CR and 2CR. Contacts 1AR3 complete a partial energizing circuit for the relay LR. As the discharge voltage drops, voltage relay 1VR drops out closing the back contacts of 1VR1 completing an energizing circuit for the coil of control relay 1CR and relay LR. Relay 1CR immediately opens its contacts shunting the resistor R2 and inserts this resistor in the discharge circuit while the relay LR opens its contacts in the energizing circuit for the coil of the relay 1VR thus preventing further operation thereof in the instant discharge cycle. This action of inserting the resistor R2 by the relay 1CR may take place at an earlier time than the time T1 indicated in Figs. 3 and 4 with a smaller ohmic value of resistor R2 than that of Figure 1 to produce an earlier voltage peak. When the discharge voltage again drops the relay 2VR, set for dropout at a lower voltage then the relay 1VR, drops out thus energizing relay 2CR and inserting the final stage of resistance in the field circuit. Here again additional discharge resistance may be utilized of such value to obtain the optimum rate of decay of the field flux.

The embodiment of the invention illustrated in Fig. 5 utilizes the field discharge voltage to control a solenoid S which, in turn, controls the pressure applied to a carbon pile resistance element R. Movements of the plunger of the solenoid are transmitted through a bell crank to one extremity of the carbon pile resistor R, the mechanical arrangement being such that energization of the solenoid coil increases the pressure applied to the carbon pile resistor. A tension spring affixed to the bell-crank extremity bearing against the carbon pile resistor, opposes bell-crank movements caused by the solenoid. Thus when the back contacts of the contact assembly FS2 connect the carbon pile resistor R and the solenoid coil S across the field circuit there results an action graphically explained in Figs. 9 and 10 by the dotted curves. At the first instant when the discharge voltage is high the solenoid applies maximum pressure to the carbon pile assembly. Hence, its resistance is a minimum value. As the voltage drops the solenoid pull diminishes and the tension spring functions to relieve the pressure on the carbon pile thus increasing its resistance. Thus the field flux and voltage as a consequence of the gradual insertion of discharge resistance are reduced to a minimum value in a very short time as a comparison of the dotted curves with the full line curves representative of a fixed resistance depicts.

A variant of the arrangement of Fig. 5 is had in Fig. 6 wherein the solenoid is time delayed by means of the dashpot D and is energized from a separate source through the contacts of the voltage relay VR, which relay is energized by connection of its coil across the discharge circuit at the back contacts of the assembly FS2. In this arrangement the bell crank is reversed and the solenoid now relieves the pressure on the carbon pile element R, the maximum pressure and hence minimum resistance thereof for initial field discharge now being determined by the compression spring at the carbon pile extremity of the bell crank, which spring biases the bell crank oppositely to movements thereof caused by the solenoid. The dotted curves of Figs. 9 and 10 apply here also. In the first instant of field-discharge the flux is high and an instant thereafter the voltage also peaks. VR relay thus responds and energizes the coil of the solenoid S from its separate energizing source. Movement of the solenoid plunger is limited to a predetermined rate by the dashpot D to some optimum value that the maximum discharge resistance which may be had without causing excessive discharge voltage peaks is inserted in the discharge circuit.

The electrical equivalent of the invention shown in Fig. 5 appears in Fig. 7. In this arrangement a spring contact regulator SR has the flexible conductors FC thereof connected along spaced taps of the added resistor R2 in the field discharge circuit, the resistor R1 as in Figs. 1 and 2 being the fixed maximum value the field winding insulation will permit. The free extremities of the flexible conductors carry silver contact elements which are actuated to progressively contact each other by the pivoted prod P connected to the solenoid plunger. Movements of the solenoid plunger are opposed by the tension spring, which biases the prod to open the contacts of the regulator. In the first instant of field discharge the solenoid responds to the discharge voltage peak and shunts the entire resistor R2 from the discharge circuit through the medium of the closed regulator contacts. As the discharge voltage drops and the magnetic pull of the solenoid tends to relax, the tension spring overcomes the magnetic pull sufficiently to open some of the contacts and insert resistance. The progressive insertion of resistance in the field discharge circuit continues until the field is completely discharged. The curves of Figs. 9 and 10, in general principle, are illustrative of the control characteristics of this embodiment also.

Yet another equivalent of the invention in Fig. 5 appears in Fig. 8. Here a mercury controlled device M replaces the regulator SR of Fig. 7. It carries a plurality of spaced contact disks stacked between insulating segments. The disks are connected along spaced taps of the resistor R2. A hole extending through the assembly terminates in a reservoir at the top end of the device M and in a bellows at the bottom, in which bellows the mercury is normally carried. The solenoid S, again energized by the discharge voltage when the back contacts of FS2 close, compresses the bellows B and forces mercury through the entire length of the hole. As the field discharge voltage drops the magnetic pull of the solenoid relaxes and the forces of the biasing spring removes the compression force against the bellows causing it to expand. As a consequence the mercury level in the hole falls and progressively disengages the contact discs from top to bottom until the field discharge is complete.

There are, of course, many other electrical equivalents of the particular arrangements illustrated in the drawings. There are, further, other variants of the circuit schemes illustrated which embrace the principles set forth in the drawing and the specification. It is, therefore, intended that the foregoing disclosure and the showings made in the drawings be considered only as illustrative of the invention and not in a limiting sense. The only limitations are to be determined from the scope of the appended claims.

I claim as my invention:

1. In combination, a generator having armature windings adapted for connection to a load and a field winding for exciting the generator, a field discharge circuit for said generator field winding including resistance means, switching means for connecting said discharge circuit to said field winding, and electromagnetic means responsive to the voltage of the generator field winding when connected with the field discharge circuit for increasing the resistance of said resistance means as said voltage decreases.

2. In combination, a generator having armature windings adapted for connection to a load and a field winding for exciting the generator, a field discharge circuit for said generator field winding including resistance means, switching means for connecting said discharge circuit to said field winding, said resistance means having an initial ohmic value as high as the insulation of the generator field circuit permits, and electromagnetic means responsive to the generator field voltage for increasing the ohmic value of said resistance means when the generator field induced voltage tends to drop.

3. In combination, a generator having armature windings adapted for connection to a load and a field winding for exciting the generator, a field discharge circuit for said generator field winding including resistance means, means for connecting said discharge circuit to said field winding, an electromagetic device having an operating coil and a magnetically operated member, means for connecting said operating coil across said generator field winding, and means operatively relating said magnetically operated member with said resistance means to vary the ohmic value of said resistance means.

4. In combination, a generator having armature windings adapted for connection to a load and a field winding, a source of electrical energy, a field switch having an operated position and a normal position, respectively, for connecting and disconnecting said source and said field winding, resistance means, said field switch being adapted in its normal position to connect said resistance means across said field winding, and means controlled by said field switch and constructed and arranged to increase the ohmic value of said resistance means upon the occurrence of a predetermined electrical condition in said means controlled by said field switch.

5. In combination, a generator having armature windings adapted for connection to a load and a field winding, a source of electrical energy, a field switch having an operated position and a normal position, respectively, for connecting and disconnecting said source and said field winding; resistance means, said field switch being adapted in its normal position to connect said resistance means across said field winding, a time delay relay responsive to said field switch, and means responsive to said time delay relay for varying said resistance means.

6. In combination, a generator having armature windings adapted for connection to a load and a field winding, a source of electrical energy, a field switch having an operated position and a normal position, respectively, for connecting and disconnecting said source and said field winding, resistance means, said field switch being adapted in its normal position to connect said resistance means across said field winding, and timing means responsive to said field switch and constructed and arranged to increase the resistance of said resistance means a predetermined time interval after operation of said field switch to its normal position.

7. In combination, a generator having armature windings adapted for connection to a load and a field winding, a source of electrical energy, a field switch having an operated position and a normal position, respectively, for connecting and disconnecting said source and said field winding, resistance means, said field switch being adapted in its normal position to connect said resistance means across said field winding, a relay, circuit means including said field switch constructed and arranged to connect said relay across said resistance means when said field switch is in its normal position said relay being responsive to the field discharge voltages which occur at the first instant of connection of the resistance means with the field, and adapted to drop out when the discharge voltage decays a predetermined amount, a second relay energized and operated upon operation of the first-mentioned relay, means for holding the second relay in operated position independently of the position of the first relay, and a third relay energized when said first relay drops out and said second relay is energized for increasing the ohmic value of said resistance means.

8. In a field discharge system for a dynamoelectric machine having an armature winding and a field winding, the combination of, a discharge circuit for the field winding including electrical impedance means, a field switch, movable between operated and normal positions, said field switch in its operated position energizing said field winding and in its normal position connecting said discharge circuit across said field winding, electromagnetic means for controlling the electrical impedance of said electrical impedance means, and circuit means connecting said electromagnetic means with said field switch to effect operation of said electromagnetic means to increase the electrical impedance of said electrical impedance means after movement of said field switch to normal position.

9. In a field discharge system for a dynamoelectric machine having an armature winding and a field winding, the combination of, a field discharge circuit including electrical resistance means, a field switch movable between operated and normal positions, respectively, for energizing and deenergizing said field winding, circuit means connecting said field discharge circuit across said field winding upon movement of said field switch to said normal position, and means controlled by said field switch in the normal position thereof for increasing the electrical resistance of said electrical resistance means.

10. In a field discharge system for a dynamoelectric machine having an armature winding and a field winding, the combination of a field discharge circuit having electrical resistance means, a field switch movable between operated and normal positions, said field switch when operated energizing said field winding and when in normal position connecting said discharge circuit across said field winding, relay means having normal and energized positions and in the normal position thereof forming a shunt circuit around a portion of said resistance means, a time delay relay constructed and arranged for time delay on dropout disposed in its normal position to energize said relay means and when energized to deenergize said relay means, and means connecting said time delay relay with said field switch to be energized when said field switch is in operated position and deener ized when the field switch is in normal positio.

11. In a field discharge syster for a dynamoelectric machine having an arm. ure winding and a field winding, the combination of, a field discharge circuit having electrical resistance means, a field switch movable between, operated and normal positions, said field switch when operated energizing said field winding and when in normal position connecting said discharge circuit across said field winding, relay means having normal and energized positions and in the normal position thereof forming a shunt circuit around a portion of said resistance means, a time delay relay having a constantly energized neutralizing coil for controlling the dropout time characteristic and an operating coil, circuit means connecting said time delay relay with said relay means to energize the relay means when the time delay relay is in normal position and to deenergize the relay means when the time delay relay is in energized position, and circuit means connecting said operating coil with said field switch to be energized upon movement of the field switch to said operated position and deenergized upon movement of the field switch to normal position.

ELMER G. RATZ.

REFERENCES CITED

The following references are of record in the file of this patent:

UNITED STATES PATENTS

| Number | Name | Date |
|---|---|---|
| 1,287,244 | Creighton | Dec. 10, 1918 |
| 1,867,417 | Merrick | July 12, 1932 |
| 1,870,064 | Nickle | Aug. 2, 1932 |
| 2,169,029 | Mickel | Aug. 8, 1939 |
| 2,262,651 | Reagan | Nov. 11, 1941 |
| 2,342,845 | Cowin | Feb. 29, 1944 |